United States Patent [19]

Heaton

[11] Patent Number: 4,741,370

[45] Date of Patent: May 3, 1988

[54] ROUTER TOOL

[76] Inventor: Ken B. Heaton, Box 29, Millbrook, Ontario, Canada, L0A 1G0

[21] Appl. No.: 60,579

[22] Filed: Jun. 11, 1987

[51] Int. Cl.$^4$ ................................................ B27F 1/06
[52] U.S. Cl. .................................. 144/134 A; 83/574; 144/136 R; 144/253 R; 144/253 J; 409/229
[58] Field of Search ............... 409/229; 83/471.1, 574; 144/85, 86, 87, 134 R, 134 A, 136 R, 137, 253 R, 253 J

[56] References Cited

U.S. PATENT DOCUMENTS 1,789,125  1/1931  Wilderson ..................... 144/253 X Primary Examiner—W. Donald Bray
Attorney, Agent, or Firm—Arne I. Fors; Robert F. Delbridge

[57] ABSTRACT

A woodworking apparatus comprises a support table having a flat, circular table surface, a first power driven cutting tool mounted below the table surface having a spindle adapted to project upwardly through an orifice in the center of the table surface, a second power driven cutting tool mounted off-center from the first cutting tool below the table surface and having a spindle adapted to project upwardly through an orifice in the table surface, a guide fence mounted above said table surface on a chord thereof, means for adjusting said guide fence relative to said cutting tools radially of the circular table surface between a position substantially central of the table surface diametral thereof to a retracted chordal position; and means for adjusting said guide fence angularly about the table surface, whereby the effective distance between the two cutting tools can be selectively adjusted by radial and angular adjustment of the said guide fence.

The means for adjusting the guide fence radially comprises a rearward extension forward on the guide fence centrally thereof, said rearward extension having a radial slot, and said means for adjusting the guide fence angularly about the table surface comprises a bracket having attachment means for securing the bracket to the table surface, said bracket having a radial recess for receiving the said rearward extension for sliding radial travel therein. Means are provided for selectively locking the rearward extension in said radial recess for radial adjustment of the guide fence over the circular table surface.

The circular table surface preferably has a circular edge perimeter, the bracket is arcuate, and the attachment means secure the bracket to the table circular edge as a downwardly extending peripheral flange.

4 Claims, 3 Drawing Sheets

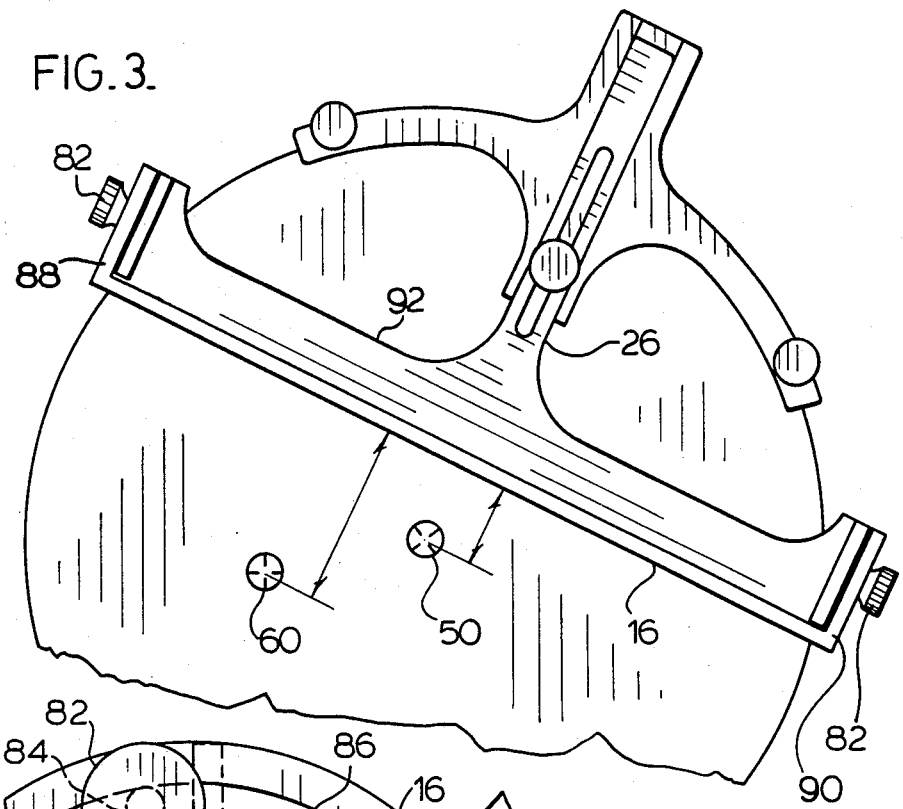
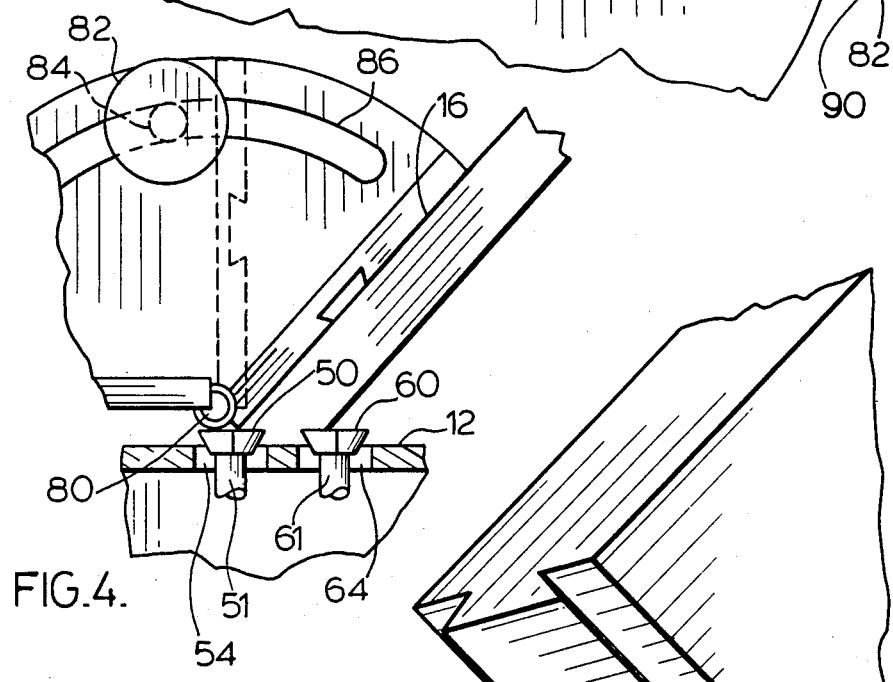

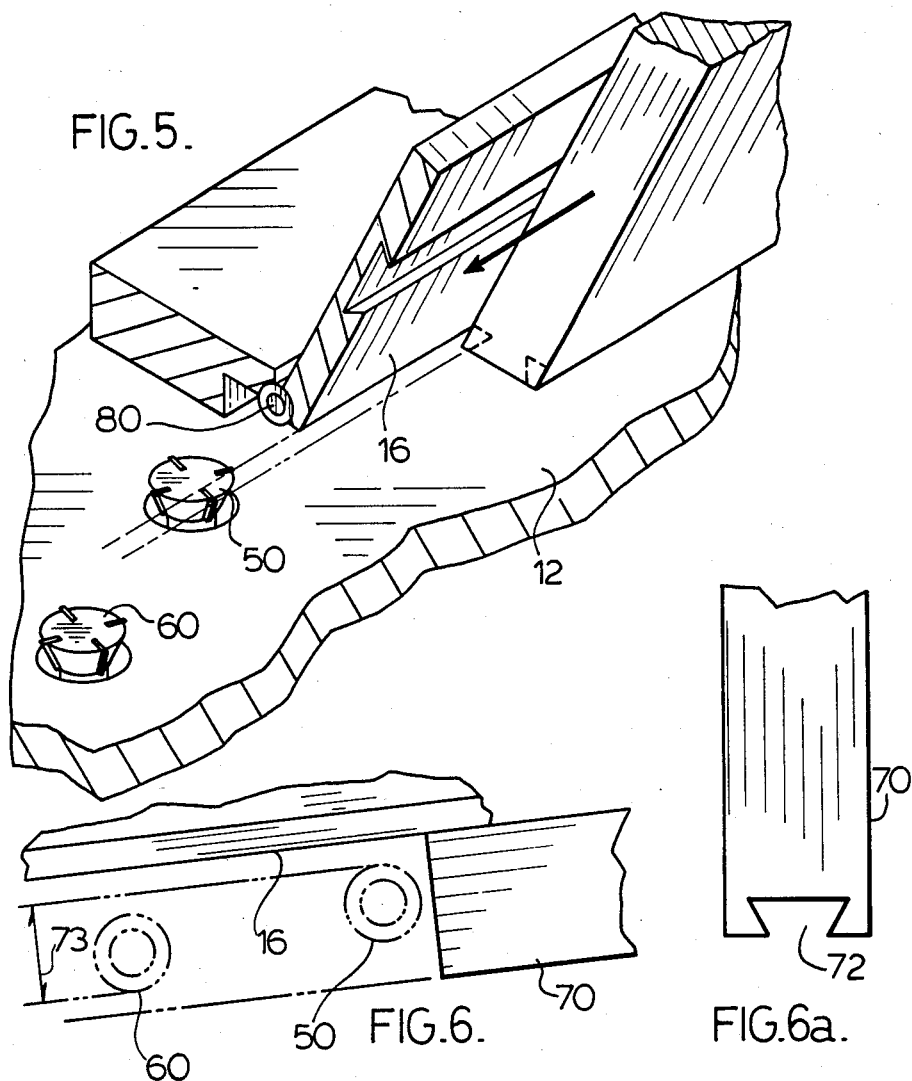

ROUTER TOOL

BACKGROUND OF THE INVENTION

This invention relates to a woodworking apparatus and, more particularly, relates to a woodworking apparatus for supporting a pair of cutting tools for producing tenons, mortises and the like joints of various widths.

Woodworking machines such as routing tables for supporting a vertical, rotating spindle which carries a cutting tool for forming the components of dovetails or splines are well known. However, conventional routing and the like woodworking machines normally are restricted to the forming of a cut of a specific size or type of groove and cannot be easily modified to provide cuts of various sizes.

U.S. Pat. No. 3,604,484 granted Sept. 14, 1971 discloses a woodworking machine having a table comprised of two plates, the top plate being slidable over the bottom plate, in an effort to improve the versatility of the machine.

U.S. Pat. No. 2,799,305 granted Jul. 16, 1957 discloses a work table and adjustable fence for small power tools in which the fence can be adjusted radially and angularly on the work table to enhance the versatility of the fence relative to the central cutting or forming tool.

U.S. Pat. No. 4,281,694 granted Aug. 4, 1981 discloses another embodiment of cutting guide for a router or the like tool for making cuts in a workpiece wherein the guide can be fixed in any angular orientation relative to the workpiece.

A woodworking machine having a pair of routers serially mounted on a pivotable support is disclosed in U.S. Pat. No. 4,328,847 granted May 11, 1982. The routers cut in a single pairs both male and female portions of a dovetail joint and are adjutable by means of a yoke arrangement which means the routers in a seesaw manner relative to each other.

It is an object of the present invention to provide a woodworking apparatus which is relatively simple in construction and operation but which will permit versatility in the size and shape of a cut formed in a work piece.

STATEMENT OF INVENTION

In its broad aspect, the woodworking apparatus of the present invention comprises the combination of a support table having a flat, circular table surface, a first power driven cutting tool mounted below the table surface having a spindle adapted to project upwardly through an orifice formed in the table surface substantially centrally thereof, a second cutting tool mounted off centre below the table surface having a spindle adapted to project upwardly through an orifice in the table surface, a guide fence mounted above said table surface on a chord thereof, means for adjusting said quide fence relative to said cutting tools radially of the circular table surface between a position substantially diametrical of the circular table surface to a retracted chordal position, and means for adjustably rotating said guide fence angularly about the table circular surface, whereby the effective distance between the two cutting tools can be selectively adjusted by radial and angular adjustment of the guide fence.

The means for adjusting the guide fence radially of the circular table surface comprises a rearward extension formed on the guide fence centrally thereof, said rearward extension having a radial slot, and said means for adjusting the guide fence angularly about the table surface comprises a bracket having attachment means for securing the bracket to the table surface, said bracket having a radial recess for receiving the said rearward extension for sliding radial travel therein. Means are provided for selectively locking the rearward extension in said radial recess for radial adjustment of the guide fence over the circular table surface.

The circular table surface preferably has a circular edge perimeter, the bracket is arcuate, and the attachment means secure the bracket to the table circular edge at a downwardly extending peripheral flange.

BRIEF DESCRIPTION OF THE DRAWING

FIG. 3 is a plan view corresponding to FIG. 2, in which the guide fence has been rotated angularly to change the effective distance between the two cutting tools;

FIG. 4 is a sectional view which shows adjustment of the fence to an angle of about 45° to the horizontal;

FIG. 4(a) is a perspective view which shows a workpiece tenon produced by the apparatus in the operating position illustrated in FIG. 4;

FIG. 5 is a perspective view of the guide fence as shown in FIG. 4 relative to the two cutting tools;

FIG. 6 is a plan view of the guide fence relative to the cutting tools;

FIG. 6(a) is an end elevation shows a mortise produced by the apparatus in the operating position illustrates in FIG. 6;

FIG. 7 is a plan view of the guide fence relative to the cutting tools in another operative position, and FIG. 7(a) is an end elevation which shows a tenon produced by the apparatus in the operating position illustrated in FIG. 7.

DESCRIPTION OF THE PREFERRED EMBODIMENT OF THE INVENTION

Figure 1:
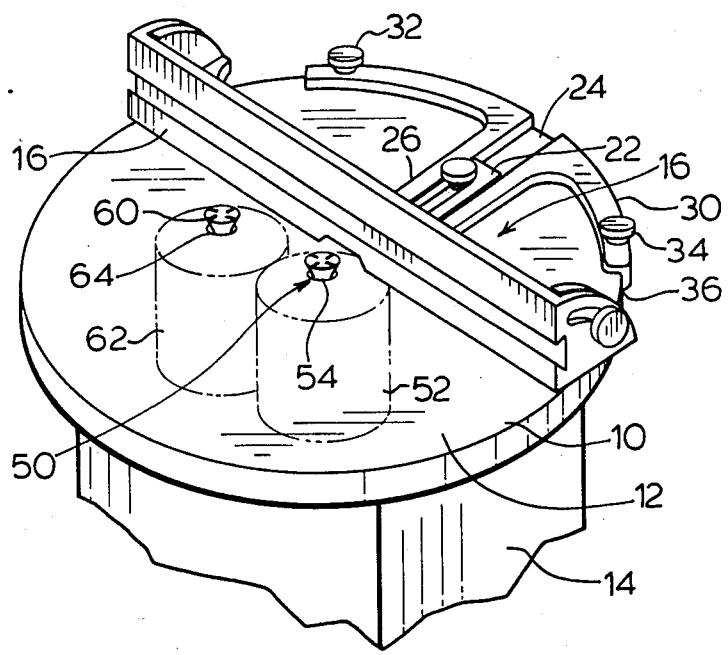
FIG. 1 is a perspective view of the woodworking apparatus of the present invention.
Figure 2:
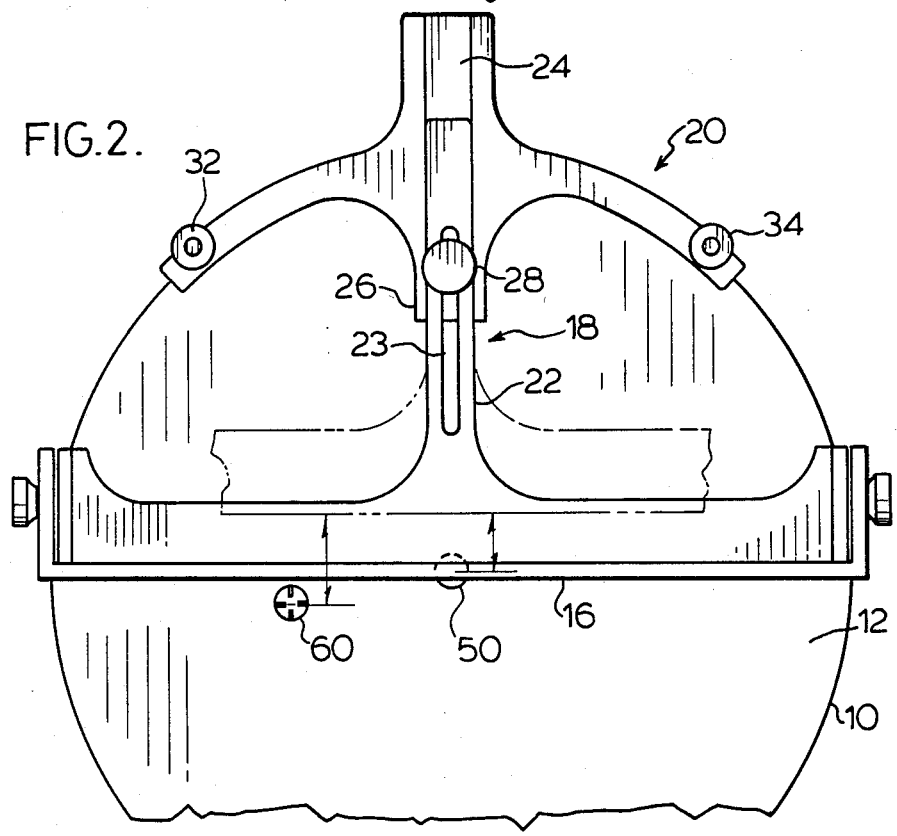
FIG. 2 is a plan view, partly cut away, of the apparatus shown in FIG. 1.

With reference to FIGS. 1, 2 and 3 of the drawings, the apparatus of the present invention comprises a table 10 having a circular planar table surface 12, table 10 being supported by a base 14 or legs, not shown. Although a circular table top is shown, it will be understood that the table top may be rectangular with a circular area for accurate rotation of a guide fence around a central point for reasons which will become evident as the description proceeds.

A guide fence 16 mounted across circular table surface 12 along a chord thereof is adapted for radial and angular adjustment above and about the periphery of the table surface 12 by guiding and locking means 18 and 20 respectively. Radial adjustment means 18 comprise extension 22, having a elongated slot 23, extending rearwardly perpendicular from the center of guide fence 16. Extension 22 is seated in a mating recess 24 in member 26 extending forwardly radially from angular adjustment means 20. Guide fence 16 can be guided and adjusted radially in slot 24 and locked in a desired chordal position ranging from a substantially diametral central position shown in FIG. 2 to a selected retracted chordal position depicted in FIG. 3 by locking screw 28 threaded into radial member 26.

Angular adjustment means 20 comprise arcuate bracket 30 adapted to overlie and engage the edge of table surface 12 for rotation about the table surface for angular adjustment thereon. A pair of locking screws 32, 34 each has a clamp 36 adapted to underlie and engage downwardly inclined peripheral flange 38 extending about the edge of table surface 12 for attachment of bracket 30 thereto in a desired angular position.

A first power driven cutting tool 50 having motor 52 is centrally located below the table surface 12 and secured thereto by a mounting bracket, not shown, for vertical adjustment of the spindle 51 of tool 50 through the orifice 54. Although the invention will be described and exemplified with reference to the cutting of mortises and tenons for slot dovetails, it will be understood that the invention encompasses other woodworking functions such as a vertical pin router, hand router, spindle shaper, tenon machine and the like.

A second power-driven cutting tool 60 having motor 62 is located below table surface 12 off-center a fixed distance from cutting tool 50 and secured thereto by a mounting bracket, not shown, for vertical adjustment of drive spindle 61 supporting cutting tool 60 through table orifice 64.

In operation, and with particular reference to FIGS. 3-7, fence 16 can be moved inwardly or outwardly radially and locked in a desired position by screw 28 above or a predetermined distance from central cutter 50 to locate a cut in a workpiece. Guide fence 16 is rotated about table surface 12 to effectively space cutters 50 and 60 relative to each other a desired distance apart, such as shown more specifically in FIGS. 6 and 7.

With reference first to FIG. 6, a workpiece 70 is manually pushed past the two cutters 50, 60 to produce a mortise 72 illustrated in FIG. 6(a). The width of mortise 72 can be readily determined by the angular rotation of guide fence 16, a clockwise rotation of guide fence 16 increasing the effective width or span 73 between cutters 50, 60 and a counter-clockwise rotation of guide fence 16 decreasing the said span 73.

With reference to FIG. 7, an effective distance depicted by numeral 74 is spaced between cutters 50, 60 whereby a tenon 76 is produced in workpiece 78. It will be evident that the angular rotation of guide fence 16 and radial adjustment of guide fence 16 relative to cutter 50 will determine the nature of the cut and its lateral dimensions.

FIGS. 4, 4a and 5 illustrate the operation of my invention in which guide fence 16 relative to the plane of table surface 12 is adjusted to an angle less than 90°, e.g., 45° as illustrated in the drawings, by pivotting of guide fence 60 about horizonal axis 80. Guide fence 60 can be locked in a desired position by lock screws 82 each having a shank 84 travelling in arcuate slot 86 formed in a pair of opposed side brackets 88, 90 in opposite ends of guide fence 16. Screws 82 are threaded into body member 92 which supports guide fence 16 at rearward extension 26.

The present invention provides a number of important advantages. The mounting of a pair of cutting tools, one central in a circular table surface and the other radially offset from the center of the circular table surface, in combination with a guide fence which is both angularly and radially adjustable relative to the center of the circular table surface, allows versatility in the dimensions and configurations, of mortises, tenons and the like shapes in work pieces. The apparatus is relatively simple in construction while permitting wide versatility in the sizes and the nature of cuts produced thereby.

It will be understood that modifications can be made in the embodiment of the invention illustrated and described herein without departing from the scope and purview of the invention as defined by the appended claims.

I claim:

1. A woodworking apparatus comprising, in combination: a support table having a flat, circular table surface; a first power driven cutting tool having a spindle mounted below the table surface, wherein said spindle is adapted to project upwardly through an orifice in the table surface substantially centrally thereof; a second power driven cutting tool mounted off-center from the first cutting tool below the table surface and having a spindle adapted to project upwardly through an orifice in the table surface; a guide fence mounted on said table surface on a chord thereof, means for adjusting said guide fence radially from a position substantially central of the table surface diametrically thereof to a retracted chordal position; and means for adjusting said guide fence angularly about the table surface, whereby the effective distance between the two cutting tools can be selectively adjusted by radial and angular adjustment of the said guide fence.

2. A woodworking apparatus as claimed in claim 1 in which said means for adjusting the guide fence radially comprises a rearward extension formed on the guide fence centrally thereof, said rearward extension having a radial slot, and said means for adjusting the guide fence angularly about the table surface comprises a bracket having attachment means for securing the bracket to the table surface, said bracket having a radial recess for receiving the said rearward extension for sliding radial travel therein, and means for selectively locking the rearward extension in said radial recess for radial adjustment of the guide fence over the circular table surface.

3. A woodworking apparatus as claimed in claim 2 in which said circular table surface has a circular edge perimeter, said bracket is arcuate and said attachment means secure the bracket to the table circular edge, and said first cutting tool has a spindle which projects upwardly through an orifice in the table surface at the center of the table.

4. A woodworking apparatus as claimed in claim 3 in which the table has a downwardly inclined peripheral flange and said arcuate bracket has locking means at each end for attachment of the bracket to the table peripheral flange.

* * * * *